Sept. 21, 1926.

L. DE L. CAMMANN 1,600,716

VEHICLE

Filed Jan. 18, 1924     2 Sheets-Sheet 1

INVENTOR.
Louis de L. Cammann

BY
Stockbridge & Borst

ATTORNEYS

Sept. 21, 1926.

L. DE L. CAMMANN

VEHICLE

Filed Jan. 18, 1924        2 Sheets-Sheet 2

INVENTOR.
Louis de L. Cammann

BY
Stockbridge & Borst.
ATTORNEYS

Patented Sept. 21, 1926.

1,600,716

UNITED STATES PATENT OFFICE.

LOUIS DE L. CAMMANN, OF NYACK, NEW YORK.

VEHICLE.

Application filed January 18, 1924. Serial No. 686,954.

This invention relates to vehicles and particularly to the regulation of the headlights of the same. In order to fully illuminate the roadway in front of a vehicle, in night driving, it is necessary to use strong headlights, but to prevent the blinding, from these lights, of the driver of a vehicle approaching in the opposite direction, it is necessary to dim or shut off the strong lights. To proceed without the strong lights upon a narrow roadway is exceedingly dangerous, especially when passing other vehicles.

An object of this invention is to provide an improved structure by which the strong or touring headlights of a vehicle may be tilted to direct the light therefrom downwardly to a greater extent and prevent it from blinding the driver of an approaching vehicle, and at the same time to illuminate brightly the roadway immediately in front of the vehicle so as to enable one to proceed with safety to both of the passing vehicles; with which the lights may be set and held in various tilted positions to which they may be adjusted; which is accessible for manipulation conveniently and readily from the operator's seat in the vehicle without interference with or by the other parts or controls of the vehicle; which may be readily applied to various existing types of vehicles without material changes therein; and which will be simple, durable, and relatively inexpensive. Other objects and advantages will be apparent from the following description of an embodiment of the invention, and the novel features will be particularly pointed out hereinafter in claims.

In the accompanying drawing:

Fig. 4 is a front end elevation on a larger scale, of a portion of the invention shown in Figure 3; and Fig. 5 is a section through a portion of a vehicle taken substantially along the line 5—5 of Figure 1.

Figure 1:
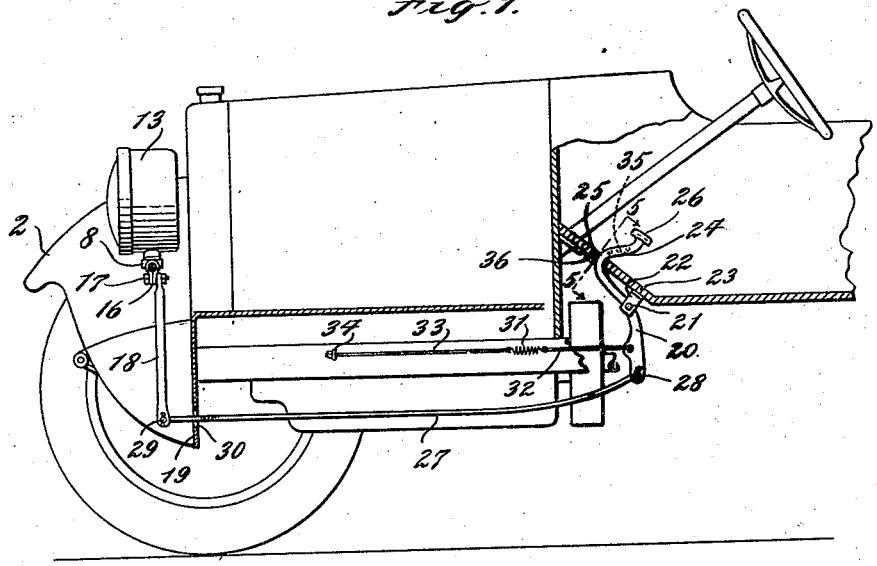
Fig. 1 is an elevation partly in section of a portion of a vehicle constructed in accordance with the invention.
Figure 2:
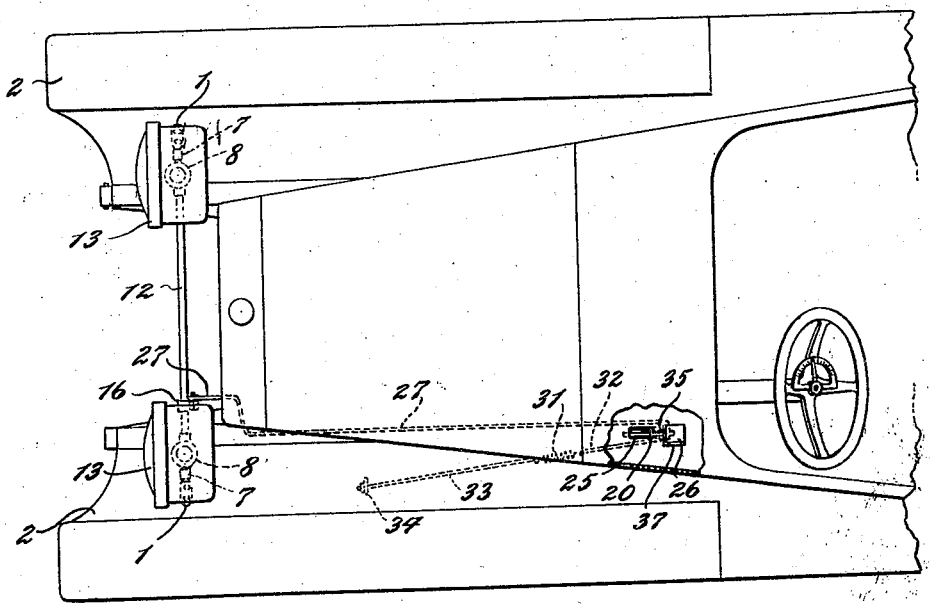
Fig. 2 is a plan of the same.
Figure 3:
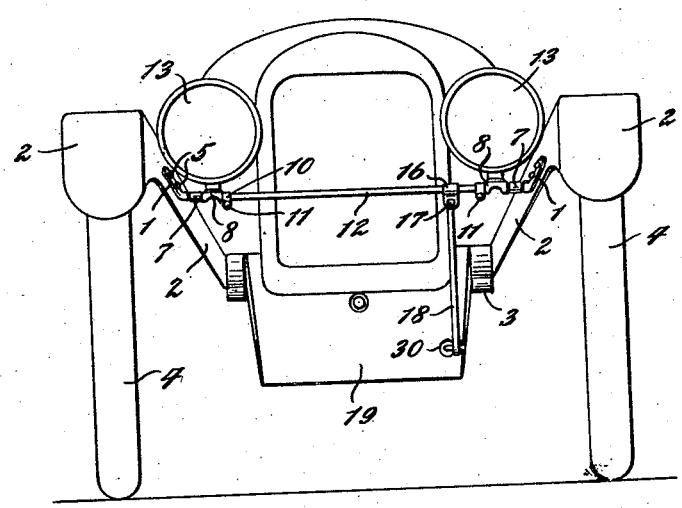
Fig. 3 is a front end elevation of the same.
Figure 3:
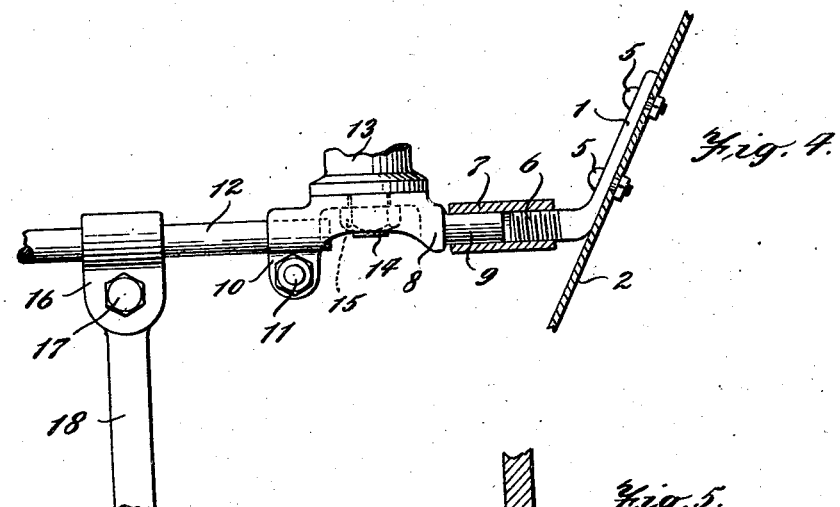
Figure 3:
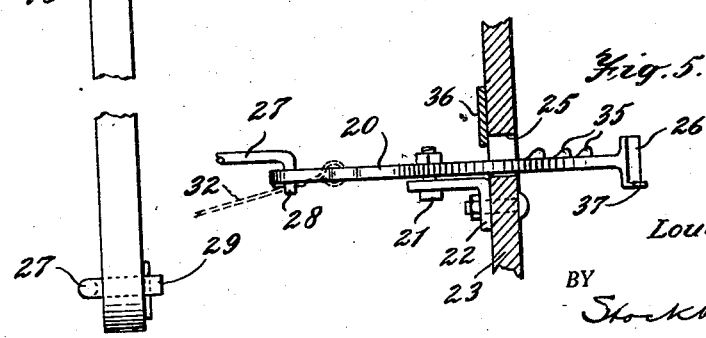

In the illustrated embodiment of the invention, a pair of brackets 1 are secured to the opposite fenders 2 which extend from the chassis frame 3 over the front wheels 4 of the vehicle. The brackets 1 may be secured to the fenders in any suitable manner, such as by bolts or rivets 5, and each bracket has a threaded end 6 threaded into one end of a short bearing sleeve 7. A base or support 8 is provided at one end with a trunnion 9 which is rotatably mounted in the free end of a sleeve 7, and opposite from the trunnion 9 each base 8 is provided with a split clamp 10 which may be tightened by a bolt 11. A rod 12 extends between the bases or supports 8 and into the split clamp 10 of each, so that when the bolts 11 are tightened the bases or supports 8 at opposite sides of the vehicle will be rigidly connected together and both rotatable together about the axis of the trunnions 9. The touring headlights 13 are secured upon the bases or supports 8 in any suitable manner, such as by a bolt 14 extending from the bottom of each of the lights and passing through an aperture in the base or support, with a nut 15 threaded upon the downwardly projecting end of each bolt and concealed within a recess in the under face of the base or support.

A split clamp 16 is provided upon the rod 12, and the arms of this clamp may be tightened by a bolt 17. An arm 18 is secured to the split clamp 16 by the bolt 17 which passes through both the clamp and the arm 18, and the arm 18 extends downwardly in front of the radiator of the vehicle to a point in front of the splash plate 19 which usually depends from the front end of the radiator.

A foot pedal or lever 20 is pivoted intermediate of its ends upon a pivot pin 21, carried by a bracket 22 which is secured in any suitable manner to the under face of the slanting foot board 23 of the interior of the vehicle, the pedal or lever 20, having a crooked end 24 passing upwardly through an aperture 25 in the board 23. The lever or pedal 20 upon its upper end, carries a tread portion 26 to enable its operation by the driver's foot. A link 27 is pivotally connected by a pin 28 to the lower end of the lever 20, and by a pin 29 to the lower end of the arm 18, the splash plate 19 at the front of the vehicle being provided with an aperture 30 through which the link 27 may freely pass. The link 27 extends along beneath the engine frame under the hood, and suitable bends may be provided therein to clear any parts of the engine or frame which may project into the line of connection between the pins 28 and 29. When the lever 20 is operated by depressing it with the foot, the link 27 will be drawn rearwardly, and through the arm 18 and its connection to the rod 12, both of the headlights will be tipped in a vertical plane, to direct the light therefrom downwardly to a greater extent, with the result that the light therefrom will be concentrated upon the roadway immediately in front of the vehicle, and consequently cannot blind, by its glare, the driver of a vehicle approaching in the opposite direction.

A suitable helical tension spring 31 is connected by a link 32 to the lower end portion of the lever 20, and by a link 33 to a suitable anchoring point 34 of the frame, so that the helical spring will constantly urge the lever 20 in a direction to shift the link 27 forwardly and tip the lights upwardly. The spring serves to yieldingly hold the headlights in their upper or normal position in which they direct the light forwardly in the usual desired manner. The engagement of the upper arm of the lever 20 with the foot board 23 serves to limit the movement of the lever or pedal and through it limit the upward movement of the lights under the action of the spring 31. One side face of the upper arm of the lever or pedal 20 may be provided with ratchet teeth 35, which are adapted to engage beneath the edge of a latch plate 36 provided upon the floor board 23 in such a manner as to extend slightly over the aperture 25 through which the lever passes.

The spring 31 extends from the lever 20 in a direction oblique to the plane of the lever, so that the tension of the spring which is continually exerted upon the lever will tend, not only to return it to its normal position with the tread 26 upwardly, but will also, by reason of its biased connection to the lever, serve to rock the lever sidewise upon its pivot 21 and carry the ratchet teeth 35 laterally or against the latch plate 36. The engagement of the ratchet teeth 35 with the latch plate 36 will serve to hold the lever or pedal in various depressed positions. To release the lever or pedal and permit it to return to its normal position, it is merely necessary to shift the lever laterally to carry the ratchet teeth from engagement with the latch plate 36, whereupon the spring will promptly return the lever to its upper normal position and elevate the lights 13 to their normal driving positions. The tread 26 may have thereon a flange 37 at one edge, so as to facilitate a lateral displacement of the lever by the driver's foot, when it is desired to return the lights to their upper normal driving position.

In the use of the illustrated embodiment of the invention, the brackets 1 are secured at the forward end of the vehicle upon any suitable parts thereof, such as the fenders 2, the lights mounted upon the bases that are secured to the rod 12, and the bases rotatably mounted in the sleeves 7 which extend from the brackets 1. When this vehicle is approaching another vehicle going in the opposite direction, the driver of this vehicle may depress the pedal or lever 20, and thus will tip the headlights so as to concentrate the light upon the roadway immediately in front of this vehicle, and prevent it from blinding the operator of the approaching vehicle. When the lever 20 is depressed, the spring 31 will automatically tip it laterally and cause the ratchet teeth 35 to move beneath the plate 36 so that the latter will prevent return of the pedal or lever when released. In this tipped position of the headlights, the roadway immediately in front of the vehicle will be brightly illuminated so as to enable one to proceed with safety and at the same time not interfere with the vision of the driver of the approaching vehicle. This, therefore, enables the continued forward operation of the vehicle with complete safety to both approaching vehicles.

After the vehicles have passed, the operator may, with his foot, tip the lever 26 laterally sufficiently to release the ratchet teeth 35 from beneath the latch plate 36, whereupon the spring 31 will at once return the lever 20 to its normal upper position and in doing so will turn the lights to their normal running position. It will be obvious that the construction by which the headlights can be manipulated in this manner, may readily be applied to all existing types of vehicles without any material changes in their construction or design, and the cost of the mechanism is relatively low. The lever 20 may be located upon the foot board 23 in a position to be convenient for manipulation, and at the same time not interfere with the manipulation of the usual clutch and brake pedals, but it will be understood that it may instead be located in a position convenient for operation by the hands of the operator while in the operator's seat.

It will be understood that various changes in the details, location, and arrangement of parts herein described and illustrated for the purpose of explaining the nature of the invention, may be made by those skilled in the art within the principle and scope of the invention as expressed in the appended claim.

Claim:

The combination with an automobile having front fenders and a floor board; brackets on said fenders having opposed and alined sockets, a pair of lamps having standards, short shafts each projecting from a standard into a respective socket, a long shaft alined with the short shafts and connecting said standards; a short arm secured to said long shaft and projecting downwardly therefrom, a lever arm having its upper end pivoted to the short arm to swing transversely of the automobile, means to clamp the arm in adjusted position, a bracket secured beneath said floor board, a pedal lever pivoted intermediate its ends to said bracket and projecting through the floor board, a link connecting the lower end of the lever arm to the lower end of the pedal lever, an anchor bolt fixed to the automobile forwardly of said pedal lever, and a spring connection between said anchor bolt and the pedal lever below the pivoted point of the latter.

In witness whereof, I hereunto subscribe my signature.

LOUIS DE L. CAMMANN.